US012580258B2

(12) United States Patent
Baek et al.

(10) Patent No.: US 12,580,258 B2
(45) Date of Patent: Mar. 17, 2026

(54) BATTERY MODULE AND BATTERY PACK INCLUDING THE SAME

(71) Applicant: LG Energy Solution, Ltd., Seoul (KR)

(72) Inventors: Seung Ryul Baek, Daejeon (KR); Jaehong Jeong, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 553 days.

(21) Appl. No.: 18/023,283

(22) PCT Filed: Oct. 14, 2021

(86) PCT No.: PCT/KR2021/014273
§ 371 (c)(1),
(2) Date: Feb. 24, 2023

(87) PCT Pub. No.: WO2022/097951
PCT Pub. Date: May 12, 2022

(65) Prior Publication Data
US 2023/0307759 A1     Sep. 28, 2023

(30) Foreign Application Priority Data

Nov. 3, 2020     (KR) ........................ 10-2020-0145152

(51) Int. Cl.
| | |
|---|---|
| *H01M 50/211* | (2021.01) |
| *H01M 50/204* | (2021.01) |
| *H01M 50/242* | (2021.01) |
| *H01M 50/502* | (2021.01) |
| *H01M 50/507* | (2021.01) |

(52) U.S. Cl.
CPC ....... *H01M 50/211* (2021.01); *H01M 50/204* (2021.01); *H01M 50/242* (2021.01); *H01M 50/502* (2021.01); *H01M 50/507* (2021.01); *H01M 2220/20* (2013.01)

(58) Field of Classification Search
CPC ............ H01M 50/211; H01M 50/204; H01M 50/242; H01M 50/502; H01M 50/507; H01M 50/224; H01M 50/50; H01M 50/503; H01M 50/20; H01M 2220/20; Y02E 60/10
See application file for complete search history.

(56) References Cited

U.S. PATENT DOCUMENTS

| | | |
|---|---|---|
| 2011/0117409 A1 | 5/2011 | Lee et al. |
| 2015/0140406 A1 | 5/2015 | Kim et al. |
| 2015/0221905 A1 | 8/2015 | Guo et al. |

(Continued)

FOREIGN PATENT DOCUMENTS

| | | |
|---|---|---|
| CN | 1815792 A | 8/2006 |
| CN | 205790141 U | 12/2016 |

(Continued)

*Primary Examiner* — Eugenia Wang
(74) *Attorney, Agent, or Firm* — Bryan Cave Leighton Paisner LLP

(57) ABSTRACT

A battery module and a battery pack including the same are provided. The battery module includes a battery cell stack, a module frame, a busbar frame, and an end plate that covers the busbar frame and is coupled to the module frame, the end plate comprising an insulating part in which the reinforcing part is inserted, and the end plate having weldability and rigidity as well as reduced weight.

15 Claims, 5 Drawing Sheets

(56) References Cited

U.S. PATENT DOCUMENTS

| | | | |
|---|---|---|---|
| 2018/0019455 A1 | 1/2018 | Chen et al. | |
| 2019/0181403 A1 | 6/2019 | Gu et al. | |
| 2021/0126313 A1 | 4/2021 | Lee et al. | |
| 2021/0151829 A1 | 5/2021 | Ishibashi et al. | |
| 2021/0344074 A1 | 11/2021 | Jung et al. | |
| 2021/0391630 A1* | 12/2021 | Chang | H01M 50/211 |

FOREIGN PATENT DOCUMENTS

| | | | |
|---|---|---|---|
| CN | 108428834 A | 8/2018 | |
| CN | 110085787 A | 8/2019 | |
| EP | 3621129 A1 | 11/2020 | |
| JP | 2020-047573 A | 3/2020 | |
| JP | 2020-520062 A | 7/2020 | |
| KR | 10-2014-0000761 A | 1/2014 | |
| KR | 10-2014-0077811 A | 6/2014 | |
| KR | 10-2015-0057261 A | 5/2015 | |
| KR | 10-2017-0053429 A | 5/2017 | |
| KR | 10-2019-0027449 A | 3/2019 | |
| KR | 10-2019-0053358 A | 5/2019 | |
| KR | 10-2019-0069130 A | 6/2019 | |
| KR | 10-2019-0112577 A | 10/2019 | |
| KR | 10-2020-0032455 A | 3/2020 | |
| KR | 10-2020-0104143 A | 9/2020 | |
| WO | 2019-021777 A1 | 1/2019 | |
| WO | WO 2020-175881 A1 | 9/2020 | |

* cited by examiner

[FIG. 1]
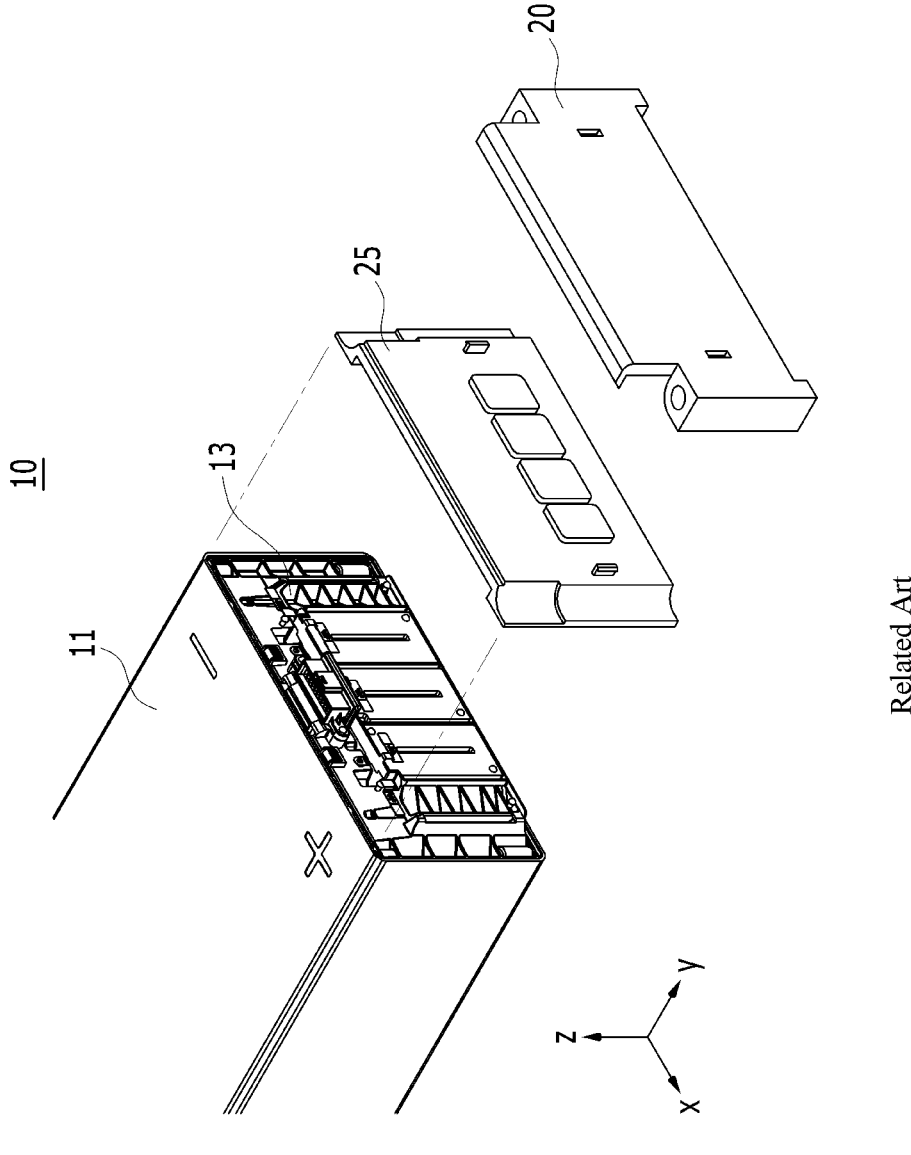
Related Art

[FIG. 2]
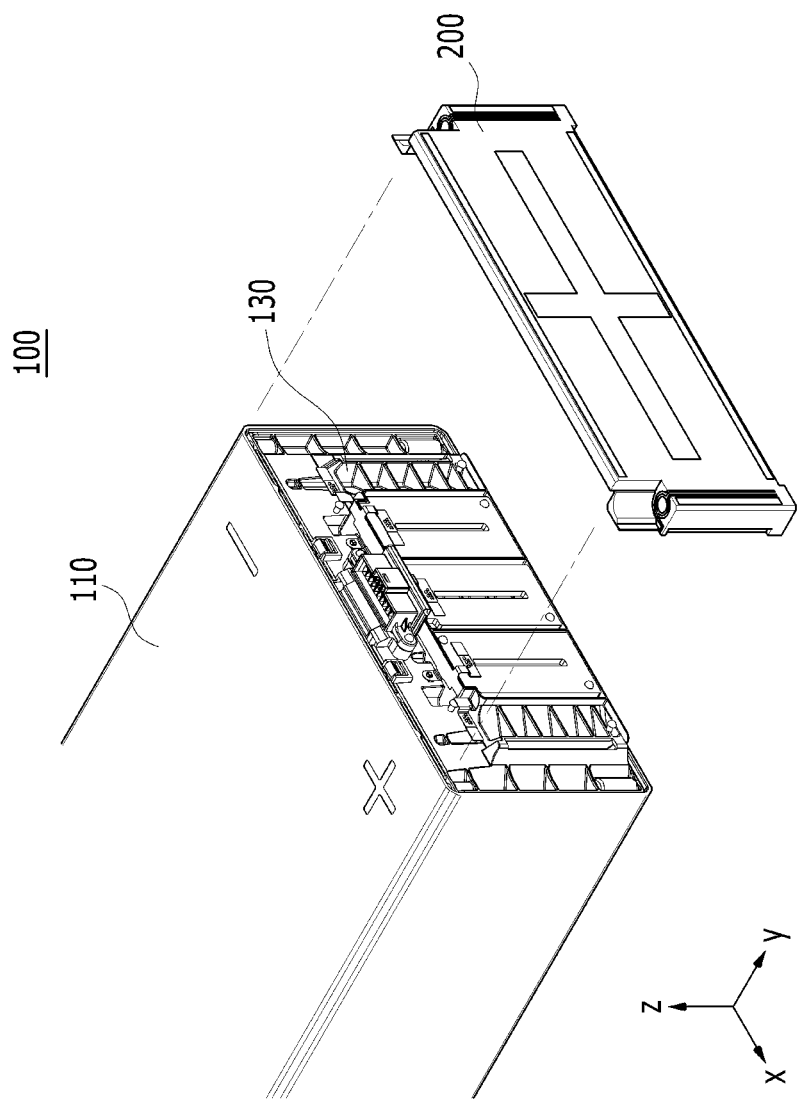

【FIG. 3】
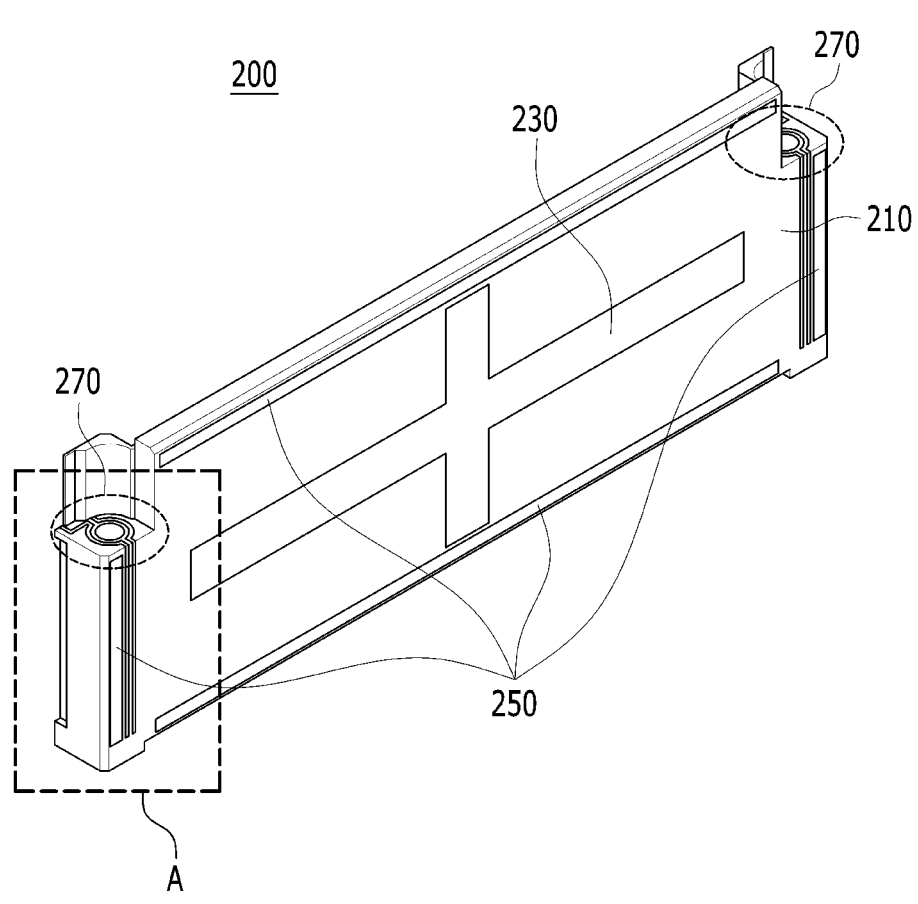

[FIG. 4]
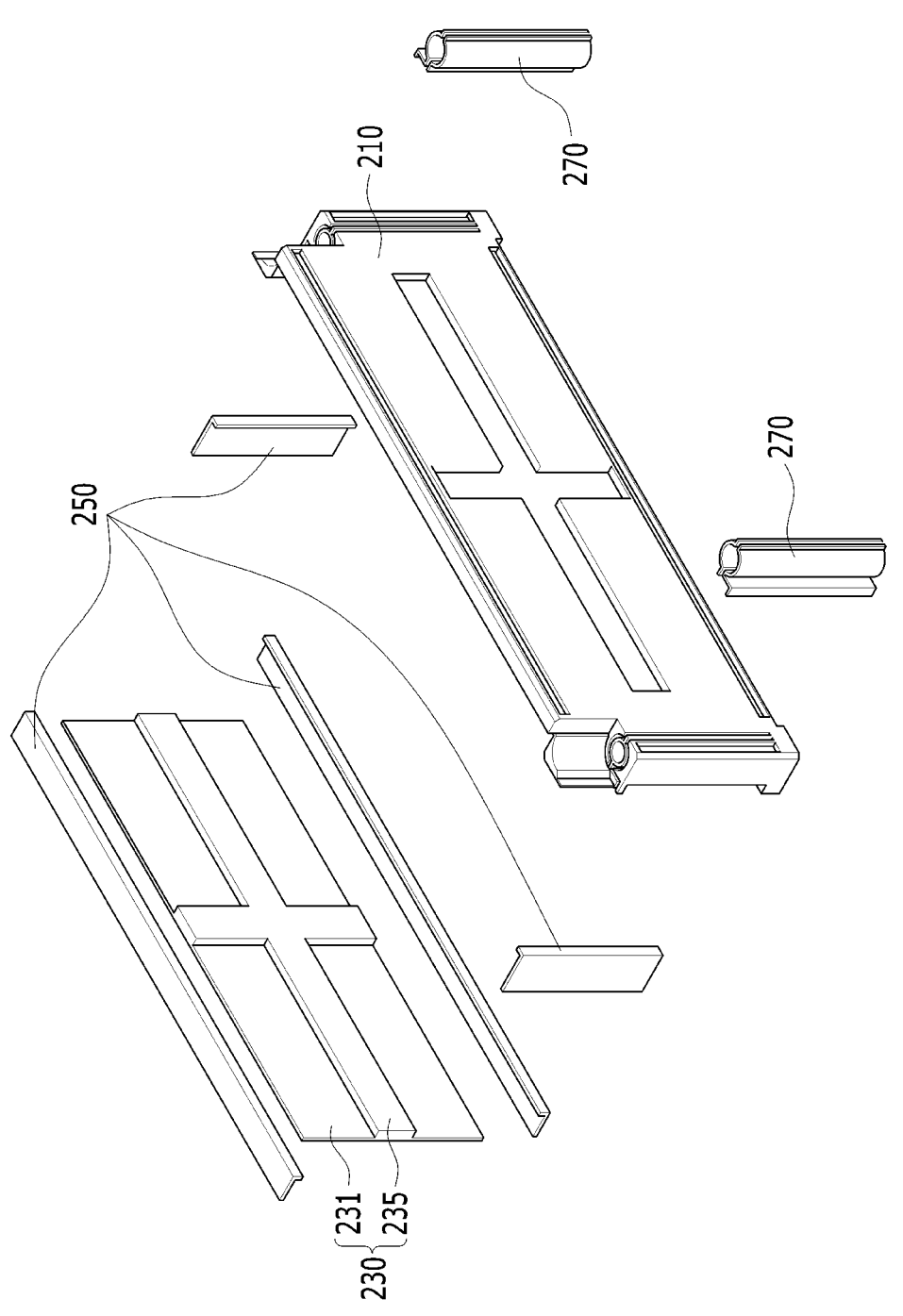

【FIG. 5】
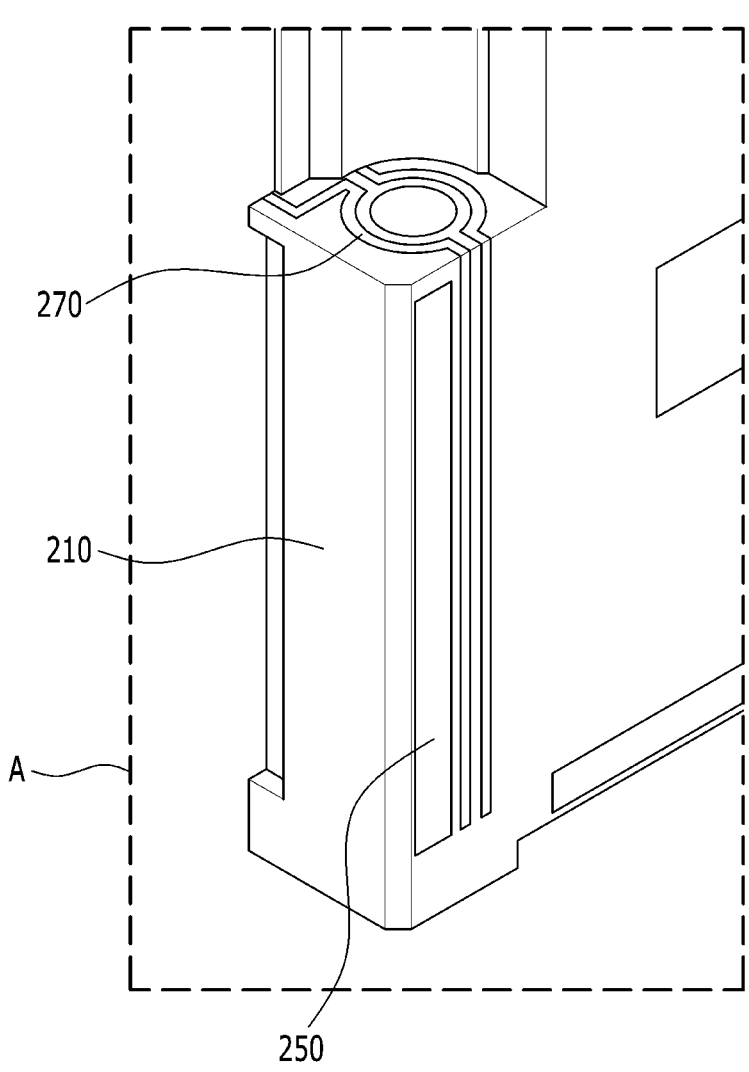

BATTERY MODULE AND BATTERY PACK INCLUDING THE SAME

CROSS CITATION WITH RELATED APPLICATION(S)

This application is a National Stage Application of International Application No. PCT/KR2021/014273, filed on Oct. 14, 2021, which claims priority to Korean Patent Application No. 10-2020-0145152 filed on Nov. 3, 2020, the disclosure of which is incorporated herein by reference in its entirety.

FIELD

The present disclosure relates to a battery module and a battery pack including the same, and more particularly, to a battery module including an end plate that ensures weldability and rigidity while reducing weight, and a battery pack including the same.

BACKGROUND

Along with the increase of technology development and demands for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

It is preferred to manufacture the middle or large-sized battery module as small and light as possible. Consequently, a prismatic battery, a pouch-shaped battery or the like, which can be stacked with high integration and has a small weight relative to capacity, is mainly used as a battery cell of the middle or large-sized battery module. Meanwhile, in order to protect the battery cell stack from external impact, heat or vibration, the battery module may include a module frame which is opened in its front and rear sides and houses the battery cell stack in an internal space.

FIG. 1 is an exploded perspective view of a conventional battery module.

Referring to FIG. 1, the conventional battery module 10 includes a module frame 11 that houses a battery cell stack (not shown) in which a plurality of battery cells are stacked in one direction, a busbar frame 13 that is located on front and rear surfaces of the battery cell stack (not shown), and an end plate 20 that covers the busbar frame 13 and is coupled to the module frame 11.

Here, the end plate 20 is generally formed of a metal material, and thus prevents breakage and deformation of the battery cells within the battery module 10 from external impact or penetration of moisture or the like. Further, as the end plate 20 is formed of a metal material, it ensures a rigidity that can fix the battery module 10 to the battery pack frame, and is weld-coupled to the module frame 11 formed of a metal material.

Here, the end plate 20 formed of a metal material has thermal conductivity, and further includes an insulating member 25 between the busbar frame 13 and the end plate 20 in the conventional battery module 10, thereby preventing the end plate 20 from coming into direct contact with the battery cell stack (not shown) and a busbar frame 13 to which a busbar electrically connected thereto is mounted. Thereby, the conventional battery module 10 adds the insulating member 25 along with the weight of the metal end plate 20 itself, whereby the weight of the entire module is increased. However, in line with the continuous trend toward the weight reduction in automobiles, the weight of the battery module 10 also needs to be reduced, and there is also need for weight reduction of the end plate 20 and the insulating member 25 included in the conventional battery module 10.

SUMMARY

It is an object of the present disclosure to provide to a battery module including an end plate that ensures weldability and rigidity while reducing weight, and a battery pack including the same.

The objects of the present disclosure are not limited to the aforementioned objects, and other objects which are not described herein should be clearly understood by those skilled in the art from the following detailed description and the accompanying drawings.

According to one aspect of the present disclosure, there is provided a battery module comprising: a battery cell stack including a plurality of battery cells; a module frame accommodating the battery cell stack; a busbar frame located on front and rear surfaces of the battery cell stack; and an end plate that covers the busbar frame and is coupled to the module frame, wherein the end plate comprises an insulating part in which the reinforcing part is inserted, and wherein the insulating part is in contact with the busbar frame.

The reinforcing part may include a first reinforcing part, a second reinforcing part, and a third reinforcing part that are disposed at different positions from each other.

The first reinforcing part may be located at a center portion of the end plate, the second reinforcing part may be located at the edge of the end plate, and the third reinforcing part may be located on a mounting part of the end plate.

The first reinforcing part may have a thickness smaller than the thickness of the end plate, while having a size equal to or smaller than the center portion of the end plate.

At least a portion of the first reinforcing part may be exposed on the outer surface of the end plate.

The first reinforcing part may have a protrusion formed on the plate.

The protrusion may be exposed on the outer surface of the end plate.

The protrusion may have a cross shape.

The second reinforcing part may extend from the outer surface of the end plate toward the inner surface at the edge of the end plate.

The second reinforcing part may be a plate having a length equal to or smaller than an edge of the end plate, respectively.

Both side surfaces of the second reinforcing part may be exposed on both surfaces of the end plate, respectively.

Among both side surfaces of the second reinforcing part, a side surface exposed to an inner surface of the end plate may be weld-coupled to a side surface of the module frame.

The third reinforcing part may be inserted into the inner surface of the mounting part.

The third reinforcing part may extend along an inner surface of the mounting part.

The reinforcing part may be formed of a metal material.

According to another aspect of the present disclosure, there is provided a battery pack comprising the above-mentioned battery module.

According to embodiments, the end plate of the present disclosure includes the insulating part in which the reinforcing part is inserted, and thus can secure weldability and rigidity while reducing weight.

The effects of the present disclosure are not limited to the effects mentioned above and additional other effects not described above will be clearly understood from the detailed description and the accompanying drawings by those skilled in the art.

BRIEF DESCRIPTION OF DRAWINGS

FIG. 1 is an exploded perspective view of a conventional battery module;

FIG. 2 is an exploded perspective view of a battery module according to an embodiment of the present disclosure;

FIG. 3 is a perspective view showing a state in which components constituting the end plate included in the battery module of FIG. 2 are combined;

FIG. 4 is an exploded perspective view of the end plate of FIG. 3; and

FIG. 5 is an enlarged view of a region A of the end plate of FIG. 3.

DETAILED DESCRIPTION

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Hereinbelow, the battery module according to one embodiment of the present disclosure will be described. However, the description herein is made based on the front surface among the front and rear surfaces of the battery module, without being necessarily limited thereto, and even in the case of the rear surface, a description may be given with same or similar contents.

FIG. 2 is an exploded perspective view of a battery module according to an embodiment of the present disclosure.

Referring to FIG. 2, the battery module 100 according to an embodiment of the present disclosure includes a battery cell stack (not shown) including a plurality of battery cells, a module frame 110 accommodating the battery cell stack (not shown), a busbar frame located on front and rear surfaces of the battery cell stack (not shown), and an end plate 200 that covers the busbar frame 130 and is coupled to the module frame 110. Here, a busbar electrically connected to the battery cell stack (not shown) may be located on the busbar frame 130.

The module frame 110 may include a U-shaped frame that is opened in its upper, front and rear surfaces and includes a bottom part and a side part, and an upper plate that covers the upper part of the battery cell stack (not shown). However, the module frame 110 is not limited thereto and can be replaced by a frame of another shape, such as an L-shaped frame or a mono frame surrounding the battery cell stack (not shown) excluding front and rear surfaces thereof.

The battery cell stack (not shown) accommodated in the module frame 110 is formed by stacking a plurality of battery cells, wherein the battery cell is preferably a pouch-type battery cell. The battery cell can be manufactured by housing the electrode assembly in a pouch case of a laminated sheet including a resin layer and a metal layer, and then heat-sealing a sealing part of the pouch case. The battery cell may be configured by a plurality of numbers, and the plurality of battery cells form a battery cell stack (not shown) that is stacked so as to be electrically connected to each other.

Next, the end plate 200 will be described in detail.

FIG. 3 is a perspective view showing a state in which components constituting the end plate included in the battery module of FIG. 2 are combined.

Referring to FIGS. 2 and 3, the end plate may include an insulating part 210 in which the reinforcing parts 230, 250 and 270 are inserted. More specifically, the insulating part 210 of the end plate 200 may be in contact with the busbar frame 130. In other words, the reinforcing parts 230, 250 and 270 may not be exposed on the inner surface of the end plate 200 in contact with the busbar frame 130.

Thereby, the end plate 200 can prevent the reinforcing parts 230, 250 and 270 from coming into direct contact with the battery cell stack (not shown) and the busbar frame 130 on which the busbars electrically connected thereto are mounted.

In one example, the insulating part 210 of the end plate 200 may be formed by insert-injecting the reinforcing parts 230, 250 and 270. More specifically, the end plate 200 can be manufactured by inserting the reinforcing parts 230, 250 and 270 into an injection mold, then injecting a molten resin into the injection mold, covering the reinforcing parts 230, 250 and 270 with the molten resin, cooling and solidifying the same after the lapse of a certain time. Here, the molten resin may be a material forming the insulating part 210. Thereby, the end plate 200 can be taken out from the injection mold by integrating the reinforcing parts 230, 250 and 270 and the insulating part 210. However, the present disclosure is not limited thereto, and any method can be used as long as the reinforcing parts 230, 250 and 270 can be inserted into the insulating part 210.

More specifically, the insulating part 210 may be formed of an insulating material. In one example, the insulating material may include a plastic material. More specifically, the plastic material may be PA66 (polyamide 66), PP (polypropylene), PC (polycarbonate), PC+ABS (a mixture of polycarbonate and acrylonitrile-butadiene-styrene), and the like. However, the insulating material is not limited thereto, and any material having insulating performance may be used.

Thereby, the end plate 200 includes the insulating part 210 and thus can be lighter in weight than in a conventional case, reduce the manufacturing cost, and simplify the manufacturing process.

Further, the reinforcing parts 230, 250 and 270 may be formed of a metal material. In one example, the metal material may include a material such as aluminum or steel. However, the metal material is not limited thereto, and any material that can be easily molded and has a light weight can be used.

Thereby, the reinforcing parts 230, 250 and 270 are inserted into the end plate 200, whereby the rigidity required for the battery module 100 can be sufficiently secured, and as the content of the metal material decreases as compared with a conventional case, the manufacturing cost can be reduced, and the manufacturing process can also be simplified.

Next, the reinforcing parts 230, 250 and 270 will be specifically described.

FIG. 4 is an exploded perspective view of the end plate of FIG. 3. FIG. 5 is an enlarged view of a region A of the end plate of FIG. 3.

Referring to FIGS. 3 and 4, the reinforcing parts 230, 250 and 270 may include a first reinforcing part 230, a second reinforcing part 250 and a third reinforcing part 270 that are disposed at different positions from each other.

Here, the first reinforcing part 230, the second reinforcing part 250 and the third reinforcing part 270 may be formed of an appropriate metal material depending on the position disposed on the end plate 200. In one example, the first reinforcing part 230, the second reinforcing part 250 and the third reinforcing part 270 may all be formed of the same or different metal materials.

The first reinforcing part 230 may be located at the center portion of the end plate 200. In other words, the first reinforcing part 230 may extend along the center portion of the end plate 200. In one example, the first reinforcing part 230 may be a plate having a size equal to the center portion of the end plate 200. Further, the first reinforcing part 230 may be a plate having a width smaller than the thickness of the end plate 200. Thereby, the first reinforcing part 230 may reinforce the rigidity of the center portion of the end plate 200.

Further, at least a portion of the first reinforcing part 230 may be exposed on the outer surface of the end plate 200. Thereby, the first reinforcing part 230 may maximize the area occupied by the center portion of the end plate 200, and may further enhance the rigidity of the center portion of the end plate 200. In addition, the first reinforcement part 230 can effectively prevent external impact and penetration of moisture or like applied to the battery module 100 through the portion exposed on the outer surface of the end plate 200.

Further, the first reinforcing part 230 may have a protrusion 235 formed on the plate 231. Here, the protrusion 235 may be exposed on the outer surface of the end plate 200. Further, the protrusion 235 may have a predetermined shape. In one example, the protrusion 235 may have a cross shape. However, the present disclosure is not limited thereto, and any shape that can be formed on the end plate 200 can be applied without limitation.

Thereby, the first reinforcing part 230 may further reinforce the rigidity of the center portion of the end plate 200 by an amount corresponding to the area of the protrusion 235 protruding from the outer surface of the end plate 200. In addition, external impact and penetration of moisture or the like applied to the battery module 100 through the protrusion 235 of the first reinforcing part 230 can be effectively prevented.

The second reinforcing part 250 can be located at a corner of the end plate 200. More specifically, the second reinforcing part 250 may extend from the outer surface of the end plate 200 toward the inner surface at the edge of the end plate 200. In one example, the second reinforcing part 250 may be a plate having a length equal to or smaller than the edge of the end plate. Thereby, the second reinforcing part 250 may reinforce the rigidity of the edge of the end plate 200.

Further, both side surfaces of the second reinforcing part 250 may be exposed on both sides of the end plate, respectively. Here, a side surface exposed to the inner surface of the end plate among both side surfaces of the second reinforcing part 250 may be weld-coupled to a side surface of the module frame. Here, the second reinforcing part 250 may be formed of a metal material, and may be formed of a metal material that can be weld-coupled together.

Thereby, the second reinforcing part 250 can maximize the area occupied by the edge of the end plate 200, and the rigidity of the edge of the end plate 200 can be further reinforced. In addition, through the side surface exposed on the inner surface of the end plate 200 in the second reinforcing part 250, it is possible to sufficiently secure the weldability with the module frame 110. Further, through the side surface exposed to the outer surface of the end plate 200 in the second reinforcing part 250, the external impact and penetration of moisture or the like applied to the battery module 100 can be effectively prevented.

The third reinforcing part 270 may be located at the mounting part A of the end plate 200. More specifically, the mounting part A located on the end plate may include an inner surface to which a fixing member (not shown) such as a screw may be coupled. As an example, the inner surface of the mounting part A may be formed with a screw thread to which the fixing member can be coupled. Here, the third reinforcing part 270 may be inserted into the inner surface of the mounting part A. In one example, the third reinforcing part 270 may extend along the inner surface of the mounting part A.

Thereby, the third reinforcing part 270 may reinforce the rigidity of the mounting part A of the end plate 200. In addition, the third reinforcing part 270 may secure the rigidity that can fix the battery module 100 to the battery pack frame.

A battery pack according to another embodiment of the present disclosure includes the battery module described above. Meanwhile, one or more battery modules according to the present embodiment may be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although preferred embodiments of the present disclosure have been shown and described above, the scope of the present disclosure is not limited thereto, and numerous other changes and modifications can be made by those skilled in the art, which also falls within the spirit and scope of the principles of the invention described in the appended claims.

DESCRIPTION OF REFERENCE NUMERALS

100: battery module
110: module frame
130: busbar frame
200: end plate
210: insulating part
230: first reinforcing part
250: second reinforcing part
270: third reinforcing part

The invention claimed is:

1. A battery module comprising:
a battery cell stack including a plurality of battery cells;
a module frame accommodating the battery cell stack;
a busbar frame located on front and rear surfaces of the battery cell stack; and
an end plate that covers the busbar frame and is coupled to the module frame,
wherein the end plate comprises an insulating part in which a reinforcing part is inserted,
wherein the insulating part is in contact with the busbar frame,
wherein the reinforcing part comprises a first reinforcing part,
wherein the first reinforcing part is located at a center portion of the end plate and extends along the center portion of the end plate, and
wherein at least a portion of the first reinforcing part is exposed on an outer surface of the end plate.

2. The battery module of claim 1,
wherein the reinforcing part further comprises a second reinforcing part, and a third reinforcing part, and
wherein the first reinforcing part, the second reinforcing part, and the third reinforcing part are disposed at different positions from each other.

3. The battery module of claim 2,
the second reinforcing part is located at an edge of the end plate, and
the third reinforcing part is located at a mounting part of the end plate.

4. The battery module of claim 3, wherein the first reinforcing part is a plate having a thickness smaller than a thickness of the end plate, and having a size equal to or smaller than the center portion of the end plate.

5. The battery module of claim 4, wherein the first reinforcing part has a protrusion formed on the plate.

6. The battery module of claim 5, wherein the protrusion is exposed on the outer surface of the end plate.

7. The battery module of claim 6, wherein the protrusion has a cross shape.

8. The battery module of claim 3, wherein the second reinforcing part extends from the outer surface of the end plate toward an inner surface at the edge of the end plate.

9. The battery module of claim 8, wherein the second reinforcing part is a plate having a length equal to or smaller than the edge of the end plate.

10. The battery module of claim 8, wherein side surfaces of the second reinforcing part are exposed on a front surface and a rear surface of the end plate, respectively.

11. The battery module of claim 10, wherein a side surface exposed to the inner surface of the end plate, among the side surfaces of the second reinforcing part, is weld-coupled to a side surface of the module frame.

12. The battery module of claim 3, wherein the third reinforcing part is inserted in an inner surface of the mounting part.

13. The battery module of claim 12, wherein the third reinforcing part extends along an inner surface of the mounting part.

14. The battery module of claim 1, wherein the reinforcing part is formed of a metal material.

15. A battery pack comprising the battery module of claim 1.

* * * * *